(12) United States Patent
Karlsson

(10) Patent No.: US 10,587,478 B2
(45) Date of Patent: Mar. 10, 2020

(54) METHOD AND APPARATUS FOR ANALYZING A COAXIAL NETWORK INFRASTRUCTURE

(71) Applicant: InCoax Networks AB, Gävle (SE)

(72) Inventor: Carl Karlsson, Sandviken (SE)

(73) Assignee: InCoax Networks AB, Gävle (SE)

( * ) Notice: Subject to any disclaimer, the term of this patent is extended or adjusted under 35 U.S.C. 154(b) by 277 days.

(21) Appl. No.: 15/822,902

(22) Filed: Nov. 27, 2017

(65) Prior Publication Data

US 2019/0109771 A1 Apr. 11, 2019

(30) Foreign Application Priority Data

Oct. 9, 2017 (EP) ...................................... 7195547

(51) Int. Cl.
| | | |
|---|---|---|
| *H04L 12/24* | (2006.01) | |
| *H04L 12/28* | (2006.01) | |
| *H04L 12/727* | (2013.01) | |
| *H04L 12/26* | (2006.01) | |
| *H04L 12/841* | (2013.01) | |
| *H04L 12/933* | (2013.01) | |

(52) U.S. Cl.
CPC ........ *H04L 41/145* (2013.01); *H04L 12/2861* (2013.01); *H04L 41/509* (2013.01); *H04L 41/5054* (2013.01); *H04L 43/0864* (2013.01); *H04L 45/121* (2013.01); *H04L 47/283* (2013.01); *H04L 49/101* (2013.01)

(58) Field of Classification Search
CPC ............... H04L 12/2861; H04L 41/145; H04L 41/5054; H04L 41/509; H04L 43/0864; H04L 45/121; H04L 47/283; H04L 49/101; H04L 1/0003; H04L 5/0048; H04B 10/071; H04B 17/345; H04H 20/77; H04W 64/00; H04W 76/10
See application file for complete search history.

(56) References Cited

U.S. PATENT DOCUMENTS

| | | | |
|---|---|---|---|
| 2016/0164745 A1* | 6/2016 | Quigley | ................ H04L 1/0003 370/252 |
| 2017/0094661 A1* | 3/2017 | Wolcott | ................. H04H 20/77 |
| 2017/0104522 A1* | 4/2017 | Zinevich | .............. H04B 10/071 |
| 2017/0272184 A1* | 9/2017 | Zinevich | .............. H04B 17/345 |
| 2017/0279653 A1* | 9/2017 | Gilson | ................. H04W 76/10 |

(Continued)

*Primary Examiner* — Le H Luu
(74) *Attorney, Agent, or Firm* — Moore & Van Allen PLLC; Henry B. Ward, III

(57) ABSTRACT

Method for generating a virtual representation of a coaxial network structure of a MoCA (Multimedia over Coaxial Alliance) network, which MoCA network comprises a plurality of node devices, including one network management device, wherein the node devices are interconnected through the coaxial network, the method includes determining a time lapse matrix having time lapse values $T_{i,j}$ representing propagation time through the coaxial network between node devices $n_i$ and $n_j$, processing the time lapse matrix to establish a branch association for each node device with respect to the network management device, and storing virtual representation data of the coaxial network comprising the branch associations.

20 Claims, 5 Drawing Sheets

(56) References Cited

U.S. PATENT DOCUMENTS

2018/0027517 A9*  1/2018  Noonan ................ H04W 64/00
                                           455/456.1
2018/0167299 A1*  6/2018  Karlsson ............... H04L 5/0048
2019/0234202 A1*  8/2019  Orban ..................... E21B 44/00

* cited by examiner

METHOD AND APPARATUS FOR ANALYZING A COAXIAL NETWORK INFRASTRUCTURE

FIELD OF THE INVENTION

The present invention relates to improvements in the art of a MoCA (Multimedia over Coaxial Alliance) networks, in which data communication is provided over a coaxial network. More specifically, it relates to methods for generating a virtual coaxial network, usable for the purpose of analyzing an infrastructure of the coaxial network.

BACKGROUND

Since television became a commodity in homes, hotels, offices and other buildings, coaxial (coax in short) networks have regularly been implemented in such facilities. As a result, a large percentage of such facilities built in developed countries during at least the last 50 years are provided with such coaxial networks. Provision of signal access to a building has been accomplished in different ways throughout the years, from the early solution with a local antenna receiver to wired cable TV connection, and later optical fiber networks. Still, there is a need to distribute access within the building, for which the local coaxial network may be used.

Multimedia over Coaxial Alliance (MoCA) is an industry standard alliance developing technology for the connected home. MoCA technology runs over the existing in-home coaxial cabling, enabling whole-home distribution of digital content. MoCA provides the backbone for the home digital entertainment network, and supports streaming media such as standard television and allows linking a set-top box to a TV and other entertainment such as computers or game consoles in multiple rooms using existing wiring.

MoCA is designed and used for providing data access within a home. To operate and gain access to an exterior network provider, a MoCA node device is required. The MoCA node device may be a MoCA adapter or modem, having at least a coaxial connector for connection to the coaxial network, and a network output, such as an Ethernet switch. The node device further includes a MoCA chip or chipset, configured to control media-sharing in accordance with one or more of the MoCA specifications, in cable-equipped households.

In a building complex, a plurality of MoCA node devices may be connected to a common coaxial network. Such coaxial networks may oftentimes have been installed in the building complex for a long time, and exact knowledge of the cable infrastructure is not always available. Today, an administrator has no tool to pinpoint a problem area related to the coaxial network upon installation or service. Furthermore, MoCA end devices are typically installed in private apartments which are not easily accessible for an installer or administrator of the MoCA system.

SUMMARY

According to a first aspect, a method is provided for generating a virtual representation of a coaxial network structure of a MoCA (Multimedia over Coaxial Alliance) network, which MoCA network comprises a plurality of node devices including one network management device, wherein said node devices are interconnected through said coaxial network, the method comprising the steps of:

determining a time lapse matrix, comprising time lapse values $T_{i,j}$ representing propagation time through the coaxial network between node devices $n_i$ and $n_j$;

processing the time lapse matrix to establish a branch association for each node device with respect to the network management device;

storing virtual representation data of the coaxial network comprising said branch association.

In one embodiment, the step of storing virtual representation data includes storing a branch identifier for each node device.

In one embodiment, the method comprises the step of:

arranging the time lapse matrix with said network management device as a node device $n_0$, and columns and rows in magnitude order of time lapse values T with respect to $n_0$.

In one embodiment, the step of processing includes comparing magnitude of time lapse values in the arranged time lapse matrix, and establishing branch association for each node device based on said comparison.

In one embodiment, the step of establishing branch association comprises determining that a pair of node devices $n_i$ and $n_j$, where i and j represents column/row order in the arranged time delay matrix, either belong to a common branch or to different branches, with respect to $n_0$, based on said comparison.

In one embodiment, the step of processing includes establishing a common branch association for a node device $n_i$ and a node device $n_j$, where i and j represent column/row order in the arranged time delay matrix and i>j, responsive to determining that time $T_{i,0} > T_{i,j}$.

In one embodiment, the step of processing includes establishing a separate branch association for a node device $n_i$ and a node device $n_j$, where i and j represents column/row order in the arranged time delay matrix and i>j, responsive to determining that time $T_{i,0} < T_{i,j}$.

In one embodiment, the step of determining a time lapse matrix comprises the steps of transmitting a reference signal from a first node device $n_i$ onto the coaxial network;

receiving a loopback signal from a further node device $n_j$ through the coaxial network;

determining a time lapse value $T_{i,j}$ based on a time lapse between transmitting the reference signal and receiving the loopback signal.

In one embodiment, said steps of transmitting, receiving and determining are carried out successively for each pair of node devices among said plurality of node devices.

In one embodiment, the method comprises the steps of transmitting a control signal from the first node device onto the coaxial network;

triggering a single further node device to act as loopback node.

In one embodiment, the reference signal is transmitted at a first frequency, and the loopback signal is received at a second frequency.

In one embodiment, the method comprises the steps of measuring attenuation values $a_{i,j}$ through the coaxial network between node devices $n_i$ and $n_j$;

storing said attenuation values $a_{i,j}$ in said virtual representation data.

In one embodiment, the step of measuring attenuation values includes transmitting a signal of a predetermined signal strength from a first node device $n_i$ to a second node device $n_j$;

detecting a signal strength of a received signal in said second node device $n_j$;

compiling an attenuation value $a_{i,j}$ based on the signal strength of the transmitted signal and the received signal.

In one embodiment, the method comprises the steps of determining cable-based attenuation values $A_{i,j}$ between node devices $n_i$ and $n_j$, based on said time value matrix;

storing said cable-based attenuation values $A_{i,j}$ in said virtual representation data.

In one embodiment, the method comprises the steps of comparing said determined cable-based attenuation values $A_{i,j}$ with said measured attenuation values $a_{i,j}$;

storing a deviation indication, based on said comparison, in said virtual representation data.

In one embodiment, the method comprises the step of displaying a representation of the coaxial network based on the stored virtual representation data.

According to a second aspect, an apparatus is provided for generating a virtual representation of a coaxial network structure of a MoCA (Multimedia over Coaxial Alliance) network, which MoCA network comprises a plurality of node devices including one network management device, wherein said node devices are interconnected through said coaxial network, the apparatus comprising a control unit including
a processing unit, and
a memory for holding computer program code, executable by the processing unit;
a memory storage for storing virtual representation data of the coaxial network;
wherein the control unit is arranged to execute computer program code in the processing unit to
determine a time lapse matrix, comprising time lapse values Ti,j representing propagation time through the coaxial network between said node devices $n_i$ and $n_j$;
process the time lapse matrix to establish a branch association for each node device with respect to the network management device;
store virtual representation data of the coaxial network comprising said branch association in the memory storage.

In one embodiment, the control unit is arranged to execute computer program code in the processing unit to carry out any of the method steps outlined above.

BRIEF DESCRIPTION OF THE DRAWINGS

Embodiments are described below with reference to the accompanying drawings, in which.

DETAILED DESCRIPTION

Figure 1:
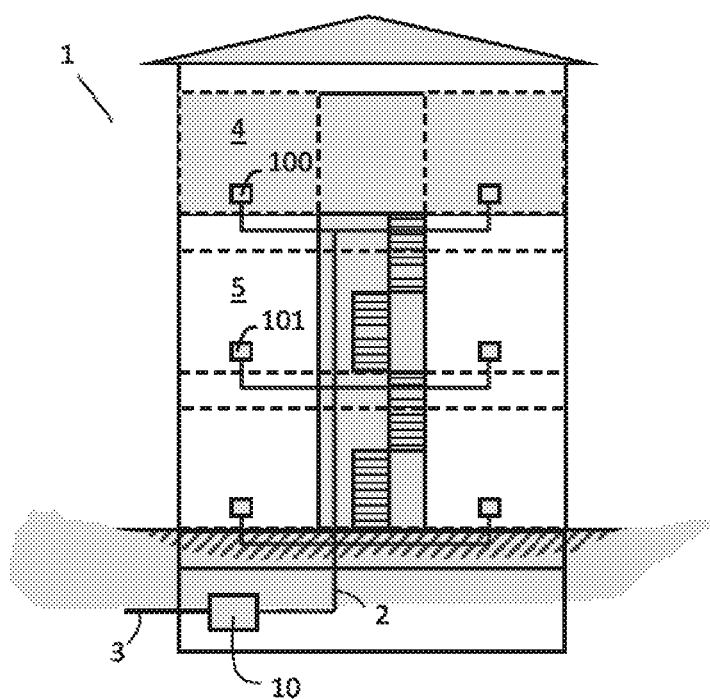
FIG. 1 schematically illustrates deployment of a system for providing data communication over a MoCA network in a construction complex.

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Embodiments provided herein serve to explain different ways of realizing a solution for analyzing an infrastructure of a coaxial network of a MoCA network, wherein the coaxial network may be used for distribution of MoCA technology into e.g. homes. When MoCA technology is adapted to be used for MoCA Access services the coaxial network used extends outside the apartment or closed space.

A technician such as an installer or administrator normally cannot access the coaxial cabling and coaxial network components in the homes without the customer's approval to enter the area. Aging and damage may make a coaxial network unusable or at least unsuitable for MoCA Access services. Normally, such problems are not general, though, but caused by local faults in the network, such as certain cables, connectors or other elements not functioning properly. A technician has today no tool to pinpoint such problem area in the coaxial network. It is also not desirable to involve the customer in the measurement process of finding the problem. This problem creates unnecessary costs for the service operator.

The embodiments presented herein are described as related to a communications network system, where MoCA technology is employed for providing data access to a plurality of independent user entities connected to a common coaxial network. This way, an already present coaxial network in e.g. a multi-family house, a hotel etc., can be employed for providing access to an external physical broadband data channel, such as an optical fiber cable. The MoCA network includes a plurality of MoCA node devices, connected to the same coaxial network. Of these node devices, one or more may be a network management device, which connects an external data channel to the coaxial network, which management device is configured with a MoCA chip. Further node devices may be one or more MoCA end devices, connected to the coaxial network, each comprising a MoCA chip. In this case, multiple node devices on the same channel share the same access medium, i.e. the coaxial network. Configuration of each MoCA end device may be crucial for enabling access to the external access network, securing network traffic isolation of individual access modems, assuring Quality of Service (QoS), and configuring other functionalities related to network parameters normally found in network chip devices. In various embodiments, a control unit comprising the MoCA chip in the network management device may be configured to establish an access function, creating a control channel over the coaxial network to each connected MoCA end device. In the MoCA end devices, a network access unit may be connected to a bus on the MoCA chip. This way, hardware signals triggered from the access function are input/output on the MoCA chip and via a bus directly to the network access unit in the MoCA end device. This creates a possibility to manufacture and design much less expensive MoCA Access modems. The savings consist of both reduced component count and reduced development time. Embodiments and methods for realizing this control signaling is disclosed in applicant's prior applications EP16178618.1 and U.S. Ser. No. 15/341,739, the content of which is incorporated herein by reference. In this context, it may be noted that the MoCA network management device is configured to control network access in the MoCA end devices. In various embodiments this may be of particular importance, since the suggested system is particularly useful for building complexes with different user entities, such as different families or companies in different apartments of a building. In such implementations, network traffic to each node device must be controlled, such that different user entities do not get access to each other. The MoCA network management device shall therefore not be confused with the concept of a MoCA Network Controller NC. However, Such a MoCA NC is configured to control MoCA operation in connected MoCA nodes, and the MoCA NC may typically be a first connected MoCA device of a plurality of interconnected and MoCA devices, which are functionally identical. On the other hand, the MoCA NC is NOT related to controlling network access provided to MoCA end devices, as the network management device included in the solutions suggested herein. On the contrary—data input to one MoCA node of the state of the art mesh network is distributed to all other nodes.

FIG. 1 illustrates, by way of example, a construction complex 1 in the form of a single building. For the sake of completeness, it may be noted that the invention as described herein may be employed in a construction complex comprising a plurality of buildings having a common coaxial network, or interconnected coaxial networks. The construction complex 1 may e.g. be a block of apartments or a hotel. In the construction complex, a number of separate building units, such as apartments, hotel rooms, offices etc. are indicated by means of dashed lines. A coaxial network 2 is provided in the construction complex 1, having sockets in all or a plurality of the different building units, such as building units 4 and 5. Both apartment buildings and hotels normally have a coaxial network covering all apartments or hotel rooms for TV signal distribution. These cables can also be used for high speed Internet access, IPTV, VoIP, Web-TV services etc. without affecting the TV signal quality. In the proposed solution, a network management unit 10 is connected to the coaxial network 2, and connected to an external data channel 3, such as a supply data cable or an optical fiber. The network management device 10 may e.g. be installed in a basement, as illustrated, or on a loft of the building 1, and may be connected after a TV amplifier. The network management device 10 may make use of the previously un-used frequency spectrum above the regular TV spectrum (5-790 MHz) in coaxial cables for data transportation. The network management device 10 is configured to merge an incoming data stream from the external data channel 3 and a TV-signal, where applicable, into the same cable and to send it through the coaxial network 2. At the other end of the coaxial network 2, the signals are divided by an end device 100, 101, such as an access modem, operating under a MoCA specification. Since the data stream and TV-signal are using separate frequency spectrums, the TV signal is effectively isolated from the data stream.

Figure 2:
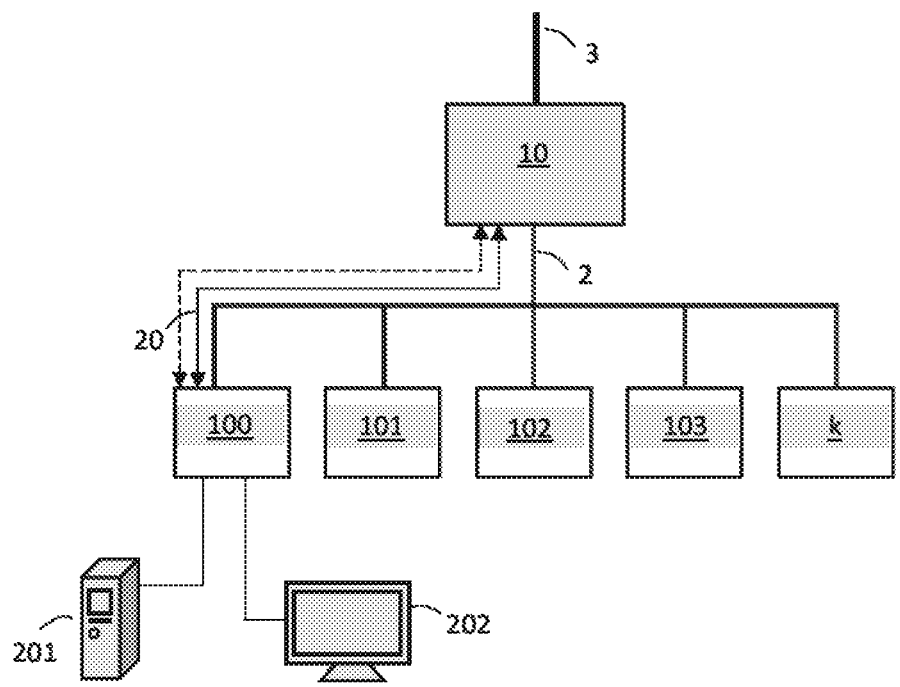
FIG. 2 schematically illustrates is a principle view of a system according to FIG. 1.

FIG. 2 illustrates the basic architectural structure of a system according to one embodiment, where the network management device 10 is shown at the top, connected between an external data channel 3 and a coaxial network 2. A plurality of MoCA end devices 100-104 are connected to the coaxial network 2, operable to obtain access to the external data channel 3 through the network management device 10. As an example, a MoCA end device 100 may receive television signals over the coaxial network 2 for output on a connected TV set 202, which may include or be connected through a set top box (not shown). In addition, the MoCA end device 100 may be configured to provide network access to a connected computer 201, usable for receiving multimedia data. The MoCA end device 100 may further comprise a wireless access point, for radio access to the MoCA end device 100 from various portable radio communication devices such as computers, mobile phones, tablets etc. Further configuration and operation of the system will be described with reference to the drawings of the network management device 10 and MoCA end device 100, respectively, by way of example.

A coaxial network in which a MoCA system is embodied may be of a star type, or a cascade type, or a combination thereof. In many older buildings having coaxial networks, the actual structure of the physical cables may in fact be unknown, since cable charts may have gone missing. This makes it even more difficult to know how far apart two node devices actually are located, signal wise. Herein, a solution is proposed for analyzing coaxial network parameters and from those generate a virtual representation of the coaxial network. The virtual representation may be used for graphically illustrating how the coaxial network infrastructure is currently setup, or for determining location of faults or problems for potential correction. The solution may be provided as a method or computer program code which may be executed in a separate test apparatus connectable to the MoCA network management device, or at least partly in the MoCA network management device, or in a remote central management node, or a combination of the above.

Various embodiments are described herein as carried out with respect to a first node device and one or more further node devices. This serves the purpose of explaining how, dependent on the circumstances, a first node device acts in one way and a further node device acts in another way, including signaling between the two. In many embodiments, the first node device may be a MoCA management device 10, comprising a first MoCA chip and being connected to an external data channel 3, whereas and each further node device is a MoCA network end device 100, such as a modem, comprising a further MoCA chip 110 and a network access unit 111 connected to the further MoCA chip. In other embodiments, the first node device may be embodied as a MoCA end device, such as a modem. In a preferred embodiment, a common hardware unit including circuits and control functions may be conveniently incorporated in both the MoCA management unit and in the MoCA end devices, wherein control signaling may be employed to operate the hardware units in different modes.

In free air, a radio signal propagates 1 meter in about 3.333 nanoseconds. In a coaxial cable, a signal propagates with a speed depending on the cable properties, but typically a signal propagates 1 meter in about 5.3 nanoseconds. The length of a coaxial cable can vary but a cable is typically between one meter and several hundred meters in a construction complex incorporating a MoCA system. This means that a maximum propagation time from a transmitter to a receiver can be up to 1 microsecond or more.

Solutions presented herein for generating a virtual representation of a coaxial network structure is based on determining time lapse values $T_{i,j}$ representing propagation time through the coaxial network between node devices ni and nj. Such time lapse values may be established by measuring propagation time between such two nodes. In a simple embodiment, where both nodes have access to a common reference signal, a pilot signal may be transmitted from a first node to a second node at a predetermined point in time, and the time of receiving the pilot signal may be determined in the second device. The time lapse values related to propagation time between different pairs of node devices may be compiled in e.g. the MoCA management unit. Such a method for determining time lapse values may not be operable or otherwise unsuitable in various cases. An alternative embodiment for obtaining such time lapse values is controlled from a first node device, which transmits a first signal to a second node device, and subsequently receives a response signal from the second node device, transmitted responsive to receiving the first signal. The time lapse value representing the propagation time between the two node devices can then be assessed in based on comparing points in time for transmitting the first signal and receiving the second signal, in the first node device. In an ideal embodiment, where no delay is applied between receiving the first signal in the second node device and sending the second signal, the total time measured in the first node device will correspond to double the propagation time. If such a delay is nevertheless present but known, it may be compensated for.

In the solutions for generating a virtual representation of a coaxial network structure as proposed herein, the step of determining a time lapse matrix comprising time lapse values representing propagation time through the coaxial network between node devices, need not involve carrying out actual measurements to obtain these values. In other words, this step of determining may be carried out by receiving either the time lapse values or the entire time lapse matrix from a memory, e.g. in the MoCA management device, or from another unit, as compiled beforehand. However, embodiments for obtaining these time lapse values are discussed herein for the sake of completeness.

In one non-limiting exemplary embodiment, a first node device such as a MoCA management device 10 may be configured to send out reference signal F1 onto the coaxial network. The reference signal may e.g. be 10.7 MHz sine signal, taken from a GPS frequency reference receiver, or a signal converted from such a GPS signal, e.g. at 22.5 MHz. Alternatively, another high accuracy signal may be provided in the first node device, acting as reference signal F1. Each further node device in the MoCA system will receive this reference signal F1 at different points in time, due to different cable lengths causing different propagation time. Each further node device is configured to be able to be set to a loopback mode, whereby it is configured to respond to a received reference signal F1 with transmission of a loopback signal F2. This loopback signal F2 may be transmitted on a different frequency, e.g. at 62.5 MHz, which may be separated in the node devices by means of bandpass filters. In an alternative embodiment, the loopback signal F2 may be transmitted at the same frequency as the reference signal F1, at which they may be separated by using circulators in the respective node devices. In any respect, the first node device is configured to measure a time lapse T between transmitting the reference signal and receiving the loopback signal, which time lapse comprises at least the time lapse due to the double propagation time.

In one embodiment, where always one and the same node device, such as a MoCA management device 10, is configured to act as the first node device $n_0$, that first node device $n_0$ needs only incorporate a signal generator capable of transmitting a reference signal F1, whereas all other further node devices $n_i$ comprise at least a signal generator be capable of transmitting a loopback signal F2. However, in an embodiment where time lapse values representing propagation time is to be compiled between each two node devices in the MoCA network, each node device $n_i$ in the MoCA network includes a signal generator with output frequency F1 and F2, and a signal detector capable of detecting a signal with frequency F1 and F2. In an embodiment where the signal frequencies of F1 and F2 are different, each node device preferably also includes two bandpass filters with center frequencies of signals F1 and F2, respectively, and bandwidth BW1 and BW2. Transmitter (Tx) and Receiver (RX) bandpass filters may form part of a combiner filter, so that it can be attached to the coaxial network. In one embodiment, each node device $n_i$ preferably includes two analog switches, configured to change between transmitting and receiving mode for the respective frequencies of F1 and F2.

Figure 3:
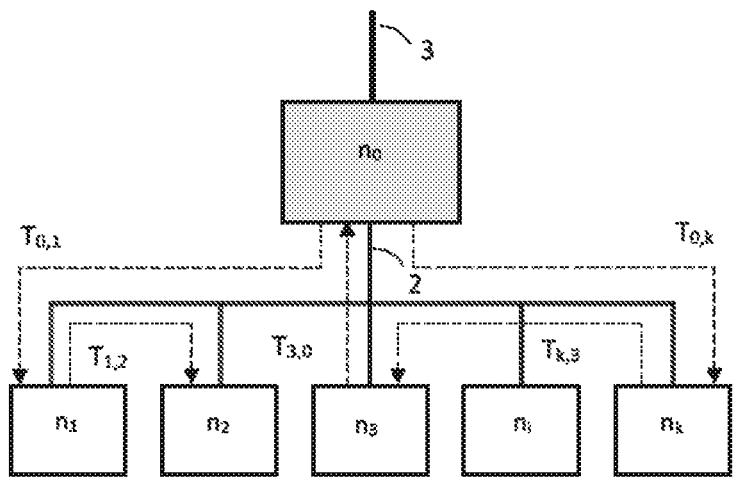
FIG. 3 schematically illustrates time lapse values between different node devices of a MoCA network associated with at least propagation time through the coaxial network according to an embodiment.

FIG. 3 illustrates a system setup according to one embodiment, in which at least the first node device $n_0$ must be able to measure time lapse T in an accurate way. Preferably, this function is incorporated in plural or all node devices $n_i$, i=1–k. In one embodiment, time lapse measurement is accomplished by commencing charging of a capacitor with a constant current upon transmitting reference signal F1, and subsequently measuring a voltage level upon detection of a responding signal F2, a certain time later. A sample and hold circuit may be included, configured to hold the voltage level constant while a control unit can sample the voltage level. The voltage level or difference is then treated as a parameter value based on time lapse between transmission of the reference signal F1 and reception of the loopback signal F2, the control unit may be configured to mathematically convert the parameter value to a time lapse T. This setup provides a solution for achieving time measurement in a cost-effective and efficient way, rather than an alternative embodiment making use of a microcontroller for measuring in the nanoseconds range, which normally is more expensive for large volume production.

In one embodiment, a first node device $n_0$ is always a set to a measurement mode, whereas all further node devices $n_i$ are set to a loopback mode. This is exemplified in FIGS. 4 and 5.

Figure 4:
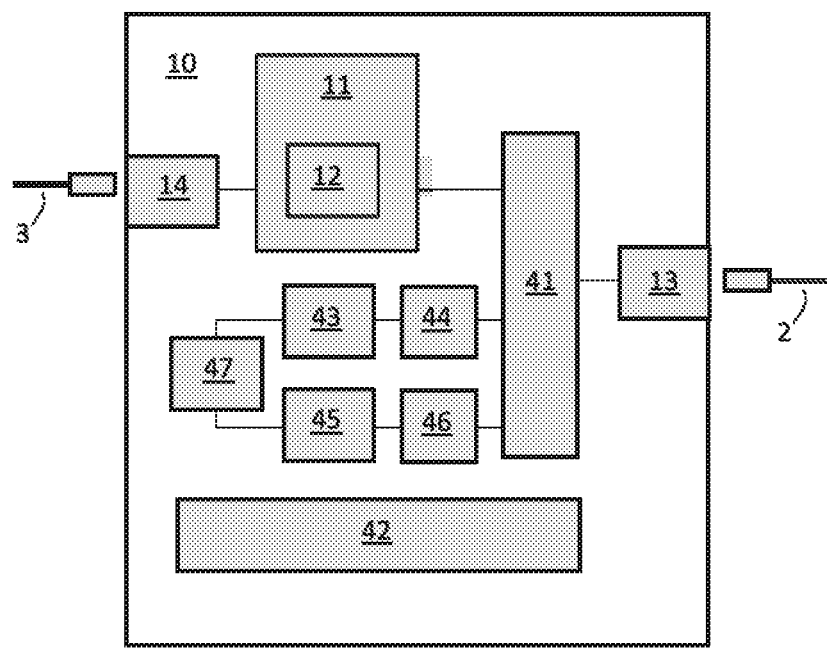
FIG. 4 schematically illustrates a node device configured in a measurement mode in a MoCA system according to an embodiment.

FIG. 4 schematically illustrates a first node device $n_0$, realized as a network management device 10 in one embodiment, comprising a connector 14 for connection to an external data channel 3, such as an optical fiber or other physical carrier of broadband data. At the other end of the network management device 10, a connector 13 is provided for connection to a coaxial network 2. A MoCA control unit 11 is provided in the network management device 10, inter alia for controlling communication with further node devices $n_i$, such as MoCA end devices 100 connected to the coaxial network 2. For this purpose, the control unit 11 includes MoCA chip 12. A MoCA chip is the hardware chip implementing the MoCA protocol and the HW required for fulfilling the MoCA specification, and such chips are available on the market. Hardware content in the MoCA chip typically includes baseband radio/power amplifier & Low noise amplifier, mixers, RF-switches, microprocessor, clock circuitry and an Ethernet packet bus of some type. MoCA chip makers apply the MoCA specification to the chip design by selection of chip content required to fulfill specification. This may vary depending on MoCA Specification version, of which currently versions 1.0, 1.1, 2.0, 2.5 exist. In the network management device, the control unit 11 may be operated to control a MoCA chip in the connected MoCA end devices $n_i$, and to access devices connected to the MoCA chip in such MoCA end devices. In the network management device 10, CATV and MoCA channels may be combined in a combiner 41, which is a frequency band selective device. The combiner may combine several MoCA channels and several CATV channels to be distributed to the same coaxial network 2. A network management device 10 may have several MoCA channels of different frequencies connected to a combiner and distributed to the coaxial network 2. The CATV signals may be origin from a satellite system, terrestrial TV system, fiber optical CATV distribution network or other source of CATV (separate input connectors for such CATV sources are not shown).

The first node device 10 further includes one or more hardware units, comprising different parts shown in FIG. 4, for measuring a time lapse T. As noted, the hardware units are preferably configured to be set in either measurement mode or loopback mode. This functionality can be integrated into the hardware unit by control signals from a local control unit 42 such as a microcontroller. In a simpler embodiment, a node device may be fixed in one of those modes. FIG. 4 illustrates a first node device 10 in a measurement mode, set or fixed, and elements that are not required for measurement mode are left out for the sake of convenience. As already noted, various embodiments are configured to distinguish between outgoing and incoming signals of the same frequency, by using circulators. In the embodiment of FIG. 4, though, the reference signal and the loopback signal propagate at different frequencies. A signal transmitter 43 is included, capable of transmitting at least a reference signal F1 of a first frequency. The signal transmitter 43 may comprise a signal generator, or it may take the frequency from a received base signal, such as a GPS signal. A first bandpass signal 44 may be included, preferably having a center frequency matching F1, and a sufficiently wide bandwidth BW1. A signal detector 45 may be connected to receive a loopback signal F2 from a further node $n_i$ device through the coaxial cable, preferably via a second bandpass signal 46. The second bandpass filter preferably has a center frequency matching F2, and a sufficiently wide bandwidth BW2. More specifically, a signal at the combiner 41 is preferably distinguished by the bandpass filters 44, 46, by means of non-overlapping bands. A measurement unit 47 may be connected to the signal transmitter 43 and to the detector 45. This measurement unit 47 may be configured to measure a parameter value based on time lapse T between transmission of the reference signal F1 and reception of a loopback signal F2, as will be described in further detail below.

Figure 5:
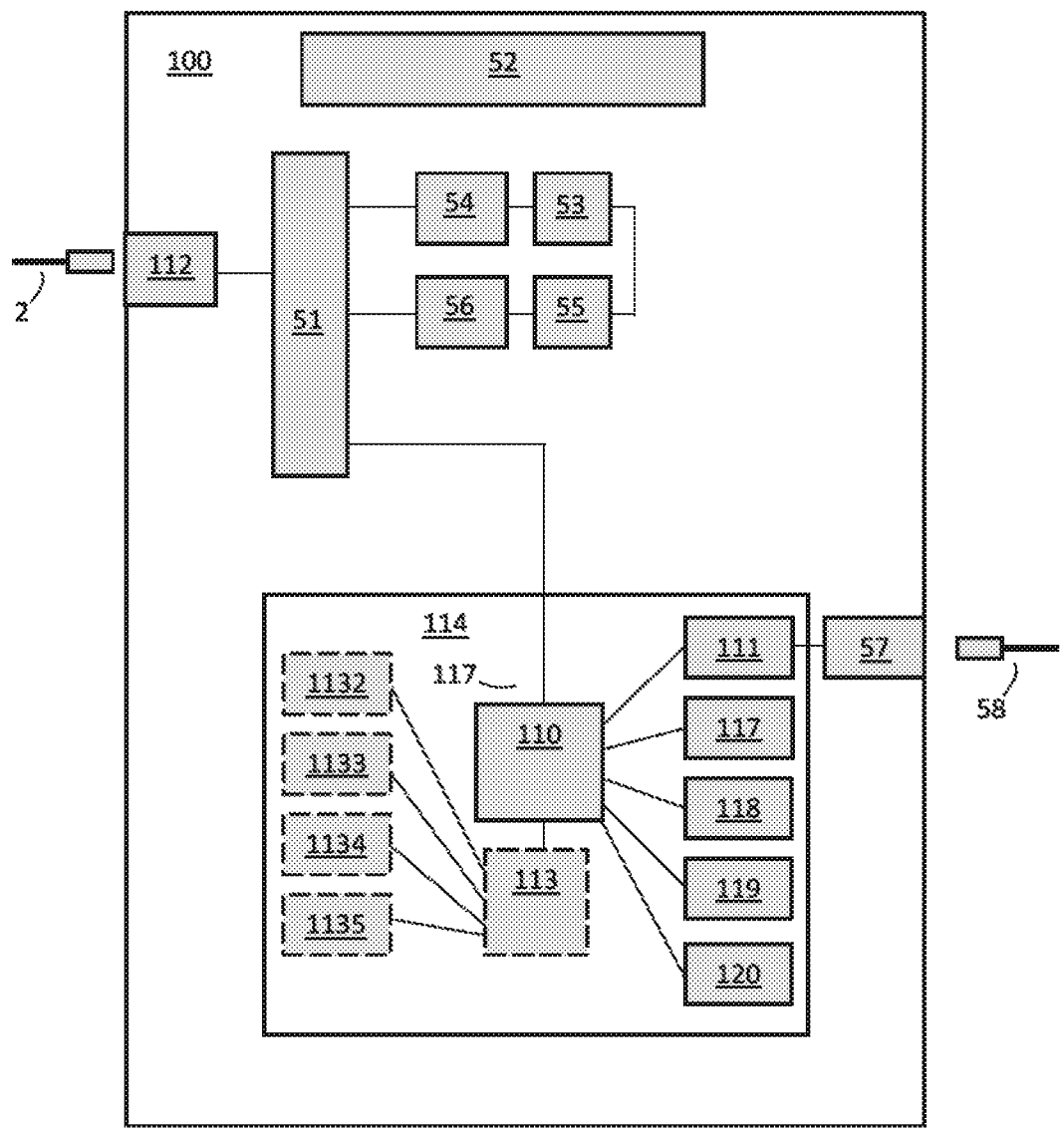
FIG. 5 schematically illustrates a node device configured in a loopback mode in a MoCA system according to an embodiment.

FIG. 5 illustrates a second or further node device 100, including one or more hardware units comprising different parts, and is configured to loopback mode. This functionality can be integrated into the hardware unit by control signals from a local control unit 52 such as a microcontroller. In a simpler embodiment, the node device may be fixed in the loopback mode. The drawing illustrates a further node device 10 in a loopback mode, set or fixed, and elements that are not required for loopback mode are left out for the sake of convenience.

The further node device $n_i$ in FIG. 5 may be a MoCA end device 100, such as an MoCA modem or network adapter. Such a MoCA end device 100 may include a plurality of components, connected to one or more PCBs 114, held in a case (not shown). A connector 112 is provided for connection to a coaxial network 2. The coax connector 112 is connected to a MoCA chip 110. This may be accomplished by means of a direct connection, or e.g. over a signal combiner 51 as in the illustrated example. In one solution for MoCA modems, the MoCA chip 110 may in turn be connected with a management data clock (MDC)/management data input/output (MDIO) interfaces and an Ethernet bus from General-purpose input/output (GPIO) to a host device 113. The host device 113 may be connected with one or more of a Double Data Rate (DDR) memory 1131, host clock circuitry 1132, a boot memory 1133, an operating system memory 1134, and a power supply 1135 for host components and filters. In such a setup, the host device 113 may be a master and the MoCA device 110 a slave. The host device, typically a microprocessor or microcontroller, translates data communication from the MoCA device to all other connected hardware devices, such as indicated devices 111, 117-120, which may include a memory 117 connected by a Serial Peripheral Interface (SPI), LED control 118 connected by GPIO, sensors 119 connected through an I2C interface, an Ethernet switch 111 connected through an Ethernet bus, and a Wi-Fi access point (not shown). The Ethernet switch 111 may further be provided with an Ethernet port 57, for connection to an Ethernet cable 58. In a variant of this embodiment, the MoCA chip 110 is the master to the various connected devices, e.g. a Memory (SPI) 117, LED-control (GPIO) 118, a temperature sensor (I2C-bus) 119, a network access device 111, such as an Ethernet switch, and a Wi-Fi Access Point 120, or any other device using a data bus (I2C, SPI, MDC/MDIO, GPIO). The MoCA chip 110 may also be connected to a host 113 over MDC/MDIO, if needed, which in turn may be connected to various devices 1132-1135 as outlined above.

In addition to the MoCA functionality as described, the further node device 100 involves a control unit 52, which may be configured by programming to control the operation of the device 100 in the loopback mode. In addition, as briefly mentioned, the control unit 52 may be addressable by e.g. the management device 10 to set the node device 100 into the loopback mode, e.g. by means of switches. This way, it may be understood by the first node device $n_0$ which device $n_t$ that will return the loopback signal.

Connected to the signal combiner 51, a signal detector 55 is configured to detect receipt of an incoming signal F1. A bandpass filter 56 may preferably be provided between the combiner 51 and the detector 55, so as to configure the signal detector 55 to be responsive to F1 specifically, by selection of a corresponding center frequency and bandwidth BW1. The signal detector 55 may e.g. be configured to sense a certain signal flank, or the rise of a signal F1 over a certain level, according to the established art. A signal transmitter 53 configured to be triggered by detection of an F1 signal by detector F1, e.g. under control of control unit 52. The signal transmitter 53 is configured to transmit a loopback signal F2 to the combiner 51, for propagation over the coaxial cable 2. Another bandpass filter 54 may be provided between the transmitter 53 and the combiner 51, with a center frequency F2 and bandwidth BW2 corresponding to F2.

Figure 6:
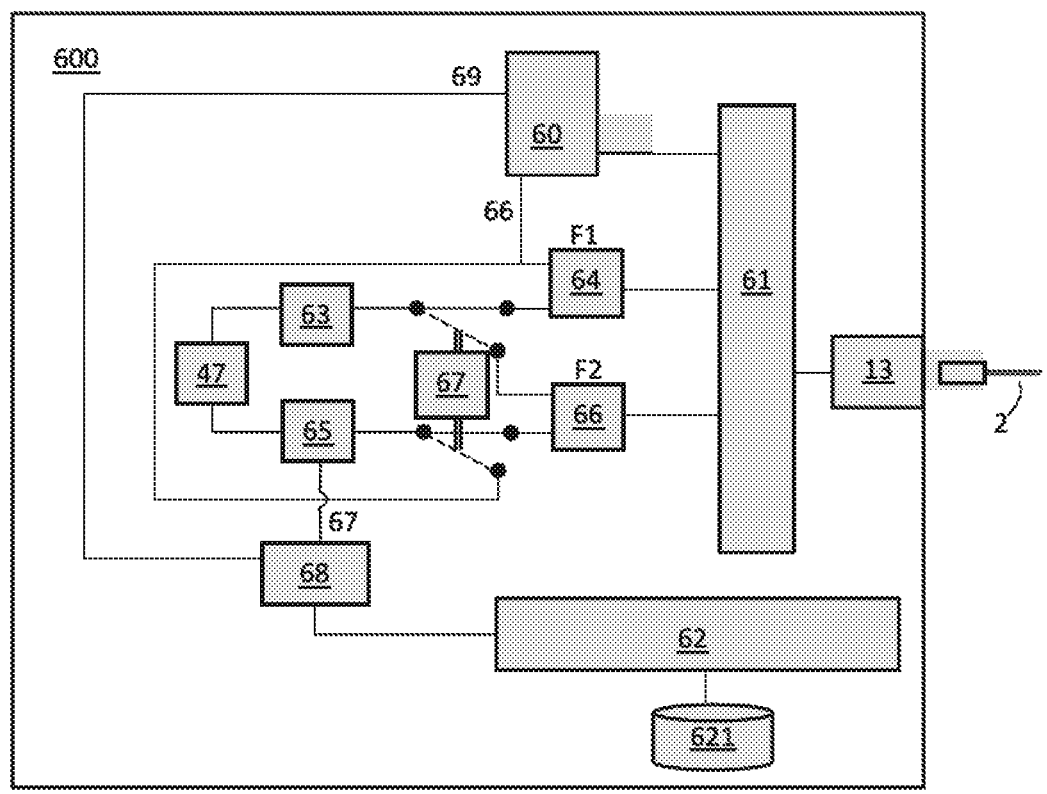
FIG. 6 schematically illustrates a node device comprising a circuit which may be selectively controlled to be set into a measurement mode or a loopback mode according to an embodiment.

FIG. 6 illustrates, by way of example, a device structure for implementation in a MoCA node device 600 according to the different embodiments described herein. This drawing exemplifies a hardware structure that may be employed in any MoCA node device 600 configured to operate in accordance with the embodiments described herein, whether it be a management device 10 (but leaving out a connector for connection to an external data channel) or an end device 100. A MoCA device 60 including a MoCA chip as described will not be described further herein. Otherwise, the hardware structure of the node device 600 includes at least a combination of the features described with reference to FIGS. 4 and 5 together with a switch device. The MoCA node device 600 has a connector 13 for connection to a coax cable 2, and a signal combiner 61 connected to the connector 13. The node device 600 further comprises a signal transmitter 63, which may include a signal generator, capable of transmitting a signal F1 and a signal F2. Alternatively, separate signal generators 43 and 53 may be included in the transmitter 63. The transmitter 63 preferably configured to selectively transmit any of at least the two frequencies of reference signal F1 and loopback signal F2. Alternatively, the transmitter may be configured to transmit a broadband signal that may be filtered into F1 or F2. The transmitter 63 is nevertheless connected to the combiner 61 through bandpass filters; one filter 64 for passing F1 and one filter 66 for passing F2. The node device 600 further comprises a signal detector 65. This signal detector 65 may comprise one detector 45 sensitive to at least a signal F2 and one detector 55 sensitive to detect a signal F1. Alternatively, detector 65 is sensitive to both F1 and F2. A measurement unit 47 may also be included, connected to the signal transmitter 63 and the signal detector 65.

In one setting, in the node device 600 is configured into measurement mode by means of a control unit 62, e.g. executed by means of a switch 67. The transmitter 63 is then configured to transmit F1 to the combiner, and to receive F2 to the detector 65, in the switch setting as shown in the drawing. The node device 600 may thereby operate as described with reference to FIG. 4. In another setting (represented by the dashed lines of the switch), the node device 600 is instead configured to operate in loopback mode. This may e.g. be set by a control unit of a management device 10, which communicates with a further device 600 so as to set said further device 600 into loopback mode. In this mode, the device 600 is configured to detect a reference signal F1 in the detector 65. The detection of the reference signal F1 triggers the transmitter 63 to emit an F2 signal, as described with reference to FIG. 5.

In preferred embodiments, the reference signal F1 may subsequently also be used for operating the synchronized MoCA network. For this purpose, a node device 600 may be configured to be set to an operational mode, where it is configured to detect F1, but preferably not to respond with a loopback signal F2. This setting may be accomplished with the switch 67, or e.g. by the control unit 62 disconnecting or turning off the signal transmitter 63. In this setting, the reference signal F1 may be conveyed to the MoCA chip 60 as a common clock reference signal 66, which may be used in a Phase-Locked Loop (PLL). In addition, a trigger signal 67 may be received with the reference signal F1 and detected by the signal detector 65, which trigger signal will be connected to a delay unit 68. The delay unit 68 may in turn be connected to transmit an activation signal 69 delayed by a determined time delay, which time delay may be stored in a memory 621, accessible by means of the control unit 62. The activation signal may be relayed to the MoCA chip 60 or to other circuits in the node device 600. This may typically be made under control of the control unit 62, and may involve retrieving accurate time delay data from the memory 621, pertaining to a suitable delay to be applied dependent on from which further node device the trigger signal 67 is received.

Referring back to FIGS. 4 and 5, an example of a measurement process usable in the method for determining time lapse values representing propagation time will be described.

The first node device 10 which is configured to measuring mode is preferably in control of the process for measuring a time lapse T, e.g. by means of control unit 42. Start of a measurement involves activating the signal transmitter 43. This may be a signal transmission triggered by the control unit 42. In an alternative embodiment, a reference signal F1 provided by the signal transmitter 43 may be a pulse train or similar, such that each pulse or on-period has a leading edge when the amplitude rises, that may be taken as a trigger for a time lapse measurement. Starting a measurement thus involves substantially simultaneously activating both the measurement unit 47 and the signal transmission of F1. In one embodiment, activating the measurement unit 47 involves charging of a measurement capacitor in the measurement unit 47. The transmitter, enabled with a frequency of signal F1, transmit a signal F1 which exits through the combiner unit 41 and onto the coaxial network 2.

After some time, the signal F1 has propagated through the coaxial network 2 and enters the signal detector 55 of a node device 100 configured for Loopback mode. When the F1 signal is detected it instantly triggers activation of a transmitter 53, which may include a signal generator of frequency F2, which transmitter 53 sends a signal F2 out through the combiner unit 51 and back on the coaxial network 2.

The loopback signal F2 enters the combiner unit 41 of the first node device 10, and is received by the signal detector 45 after passing bandpass filter 46. When the signal detector 45 senses receipt of F2 the measurement unit 47 is immediately triggered. In a preferred embodiment, a sample and hold unit samples the instantaneous voltage over a capacitor, which capacitor was subjected to charging upon detecting transmission of the reference signal F1. The control unit 42 may then be configured to read out a parameter value in the form of the voltage from the sample and hold circuit, e.g. by means of an analog to digital conversion. Dependent on known characteristics of the capacitor circuit, this voltage may subsequently be converted to a time lapse T.

The time lapse T measured by the measurement unit 47 is typically longer than only the time required for the signals F1 and F2 to propagate through the coaxial network 2. The time lapse T also contains a time period contributed by the analog and digital circuitry. However, this time period is typically almost constant, and the small variation can be accounted for by doing several measurements and averaging the result.

Time periods forming part of the total time lapse T include but is not limited to:

Activation time of the Transmitters $T_{T1}$, $T_{T2}$
Band pass filter rise times $T_{B1}$, $T_{B2}$
Coaxial cable propagation time $T_{fwd}$, $T_{rev}$ (each corresponding to the time lapse value of interest; $T_{i,j}$)
Signal detection periods $T_{D1}$, $T_{D2}$ The total time delay is, in order of occurrence through the network:

$$T = T_{T1} + T_{B1} + T_{fwd} + T_{B1} + T_{D1} + T_{T2} + T_{B2} + T_{rev} + T_{B2} + T_{D2}$$

The constant part of the time lapse T that is not related to coaxial cable propagation time can be subtracted from the time lapse T by connecting a measurement mode hardware unit to a loopback mode measurement hardware unit and averaging several time lapse results.

When measuring a time lapse, a state of the art time measuring RC network may be employed. The voltage over a capacitor when charged by a current, as is well described in common electronics books, can be expressed as:

$$V(t) = V_0 \left(1 - e^{-\frac{t}{RC}}\right)$$

Where R is the resistor through which the charge current flows and C is the capacitance value of the capacitor. $V_0$ is the voltage which generates the charge current over R. Since only V(t) is depending on time lapse (t) the calculation of time lapse can be done if V(t) is known. This parameter value V(t) is preferably sampled in the measurement unit 47 under control of the control unit 42. When the detection of signal F2 triggers a sample event, the time lapse voltage cannot be allowed to change until the control device have sampled the voltage level. This will happen if the charging of the capacitor will continue. Preferably, a sample and hold circuit is triggered very fast by the F2 detector and then holds the voltage at a constant level until the control device has sampled the voltage. The control device then clears (zeroes) the capacitor voltage and a new measurement can start.

The calculated time period, as taken from the sample parameter value V(t) can be solved but must be divided by 2 since the signal propagates back and forth over the same cable. Rearranging and solving for propagation time gives:

$$-RC * \frac{\ln\left(1 - \frac{V(t)}{V_0}\right)}{2} - \mathrm{Const} = \mathrm{propagation\_time}$$

where Const is the constant delay introduced through the bandpass filters and the electronic measurement circuitry. This provides a measurement of the propagation time $T_{i,j}$ between a node $n_i$ and a node $n_j$.

As noted with reference to FIG. 6, where a circuit structure for selective use in either a measurement mode or loopback mode is described, a transmitter 63 is required for sending either the F1 signal or the F2 signal. Since either the loopback mode or the measuring mode is selected, only one transmitter is required in each mode. Therefore, only one transmitter could be used provided that it may be configured to operate at two frequencies (F1 and F2). This would reduce the hardware costs and complexity of the design.

Similarly, a signal detector 65 is required for sensing the presence of either F1 or F2. Since either the loopback mode or the measuring mode is selected only one detector is required in each mode. Therefore, only one detector could be used if it can be configured for two frequencies (F1 and F2), which again would reduce the hardware costs and complexity of the design. If the frequencies F1 and F2 are chosen closely together a detector could be constructed that is wideband enough to detect both frequencies and it would then be the band pass filters that separate them. For detection of a F1 or F2 signal a full-wave rectifier and a diode detector can be used to sense presence of the signal arriving to the detector. The diode detector output can be amplified by an operational amplifier and a trigger voltage level can be set. The output can then trigger the sample and hold circuit or F2 transmitter.

Bandpass filters 44 and 46 are configured to block unwanted signals from entering the detector. The bandwidth BW1, BW2 must be large enough to enable fast rise times of the signals F1 and F2. A commonly assumed relationship between rise time and bandwidth are:

$$T_{B1} = T_{B2} = \frac{0.35}{BW_1} = \frac{0.35}{BW_2},$$

for a first order RC network.

The bandwidth must be large enough to make the rise times negligible compared to the total time lapse measurement period. The bandwidth in the coaxial network is so large that it will not influence the rise time. Rise times in the analog circuitry can with todays integrated circuit technology be kept small enough for an accurate measurement. A too long rise time though would impact the performance at short distance measurements so the bandwidth should be kept high enough. For example, a 35 MHz bandwidth filter would achieve 10 ns rise time.

The switch 67 indicated in FIG. 6 may be realized by means of bidirectional analog switches, configured to short circuit analog voltage from input/output to any of the two inputs/outputs. The switches serve to configure whether each frequency channel F1 or F2 are either in transmit or receive mode. The switch rise time is negligible and the switchover delay between output states does not affect the time lapse measurement since the switchover is done before the measurement starts.

Referring to FIG. 3, a MoCA network over a coaxial cable 2 is shown, including at least a first node device $n_0$ and a plurality of further nodes $n_1$-$n_k$. In accordance with the process steps described herein, propagation time $T_{i,j}$ between nodes $n_i$ and $n_j$ may be established, e.g. by measuring the time lapse between transmission of a reference signal and reception of a loopback signal. In one approximation, this time lapse may be taken as the double propagation time. In a more detailed approximation, a constant part may be subtracted from the measured time lapse, as described, to calculate the propagation time. In a preferred embodiment, the propagation time $T_{i,j}$ between any pair of node devices within the plurality of node devices may be established. This may be obtained by controlling any node device $n_i$ to act as a first node device, for transmitting a reference signal and receiving a loopback signal, together with another node device $n_j$. In a preferred embodiment, one node device acting as a first node device $n_i$ will address a further node device $n_j$, signaling said further node device to enter loopback mode. This may be obtained by means of the control channel as described in the referenced prior applications EP16178618.1 and U.S. Ser. No. 15/341,739. Every other node device in the MoCA network connected to the same coaxial cable will thus ignore the signal F1. The first node device starts the measurement and calculates the time lapse to the other node device and stores it, e.g. in a time lapse table. The first node device then deselects the addressed node device by signaling it to leave loopback mode, and continues with a next node device in a list of node devices of the MoCA network, and the cycle starts over. This may continue until all time lapses are known.

In one embodiment, a MoCA management device 10 may control the process, and may configure one node device which is incorporated in a MoCA end device 100 to measurement mode and perform the measurement with respect to another node device of a MoCA end device 101 which is set to loopback mode. Preferably, the management device 10 then reads back the result of the establishment of the time lapse value, and stores it in a time lapse table. Then the management device 10 may shift modes of both MoCA end devices 100, 101 and start the measurement again in the reverse order, and subsequently saves the result. Then it continues with all possible combinations until all time lapses are known, as indicated in FIG. 3.

Once the time lapse values between all pairs of node devices of a plurality of node devices of the MoCA network have been established, it is possible to set up a time lapse table or matrix, which describes all individual time lapse values between all node devices connected through the coaxial network. In one embodiment, a node $n_0$ may be a MoCA management device 10, whereas node devices $n_1$-$n_k$ are MoCA end devices 101-$k$. The time lapse value to itself is preferably always zero for any node. A time lapse matrix may take the shape of $$T = \begin{pmatrix} 0 & \cdots & T_{i,0} \\ \vdots & \ddots & \vdots \\ T_{0,j} & \cdots & 0 \end{pmatrix}$$

The time lapse matrix T is preferably approximately reciprocal; i.e. $T_{i,j} = T_{j,i}$.

As mentioned, a coaxial network structure can be either cascade type, star type or a mixture of both. In this context, star type may imply that a splitter divides the signal in any amount of signals and distributes the signal on equally many coaxial cables. Cascade networking may imply serially interconnected coaxial cables, and commonly taps are used in the interconnect points to unevenly split the signal, one weaker for local use and one stronger branch for distribution to the next tap. Various embodiments related to different types of coaxial networks will now be described. All point-to-point time lapses $T_{i,j}$ between the node devices may be determined by measurement and possibly subsequent subtraction of constant factors, in accordance with the methods outlined in the examples above, or by retrieving the time lapse values from a memory, as compiled by previous measurements or assessment. The time lapse values with respect to $n_0$ are indicated in the drawing, as exemplified integers of a time unit t, which may be an arbitrary time unit, e.g. t=100 ns.

Figure 7A:
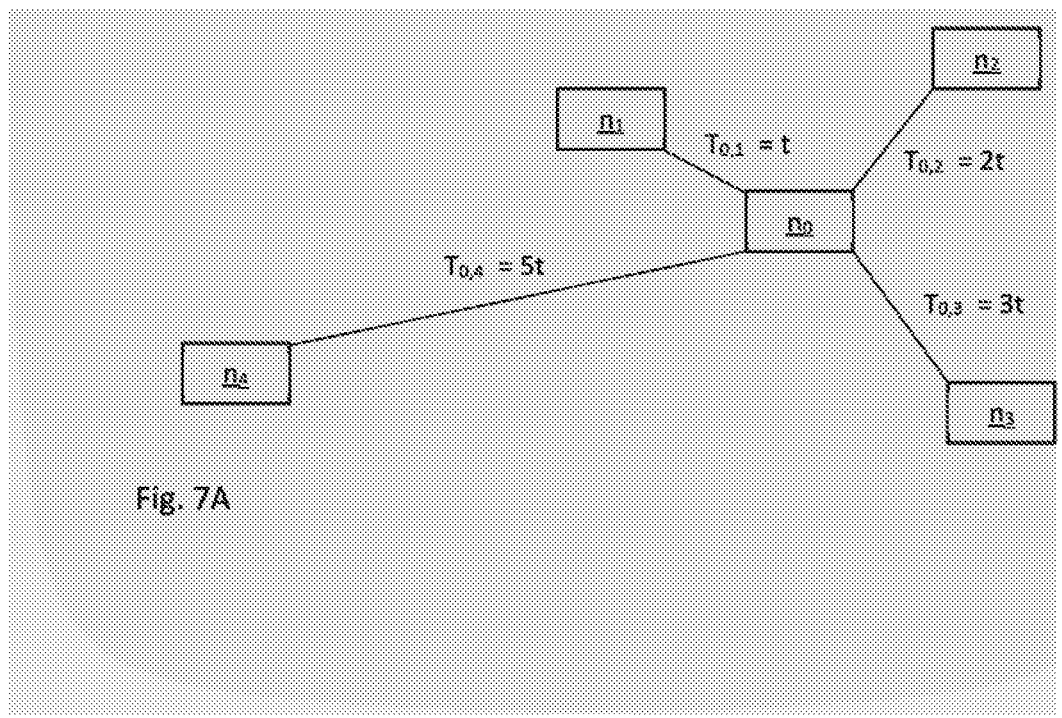
FIGS. 7A-7D schematically illustrate various embodiments of MoCA systems with node devices interconnected over a coaxial cable having different cable lengths to different node devices.

FIG. 7A schematically illustrates a MoCA network according to one simplified embodiment, in line with any of the embodiments described with reference to FIGS. 1-6. The MoCA network comprises a first node device $n_0$, such as a MoCA management device, and a number of further node devices $n_1$-$n_4$, which are interconnected over a coaxial cable 2 that forms a pure star network. Once all time lapses have been established, it is possible to set up a time lapse value matrix, where the rows and columns are numbered 0-4 for node devices $n_0$-$n_4$:

$$T = \begin{pmatrix} 0 & 1 & 2 & 3 & 5 \\ 1 & 0 & 3 & 4 & 6 \\ 2 & 3 & 0 & 5 & 7 \\ 3 & 4 & 5 & 0 & 8 \\ 5 & 6 & 7 & 8 & 0 \end{pmatrix}$$

For this embodiment, it may be noted that the columns and rows are arranged in order of magnitude of time lapse values with respect to node $n_0$. This order may be obtained upon collecting the time lapse values, or by post-sorting. The time lapse matrix T may further be processed to establish a branch association for each node device $n_i$ with respect to the management node device $n_0$. In one embodiment, this includes comparing the time lapse value $T_{i,0}$ for a node i with respect to node 0, with the time lapse value $T_{i,j}$ for node i with respect to the other nodes. The time lapse matrix is hollow and reciprocal, and processing may in one embodiment be focused on the upper triangle of the matrix.

$$T = \begin{pmatrix} 0 & 1 & 2 & 3 & 5 \\ & 0 & 3 & 4 & 6 \\ & & 0 & 5 & 7 \\ & & & 0 & 8 \\ & & & & 0 \end{pmatrix}$$

It can be observed that for every column 2-4, the time lapse value in row 0 is smaller than in the rows below, excluding the zeros. In other words, the time lapse value to the management device is shorter than the time lapse value to any other node j, from a given node i. This would indicate that a signal would pass the management device cross-point to get to another node. According to a processing rule of this embodiment, this indicates a star coaxial network. In such an embodiment, a step of storing virtual representation data of the coaxial network comprises storing a separate branch association indication for each node 1-4, such as e.g. by means of separate values or identifiers B1 to B4.

Figure 7B:
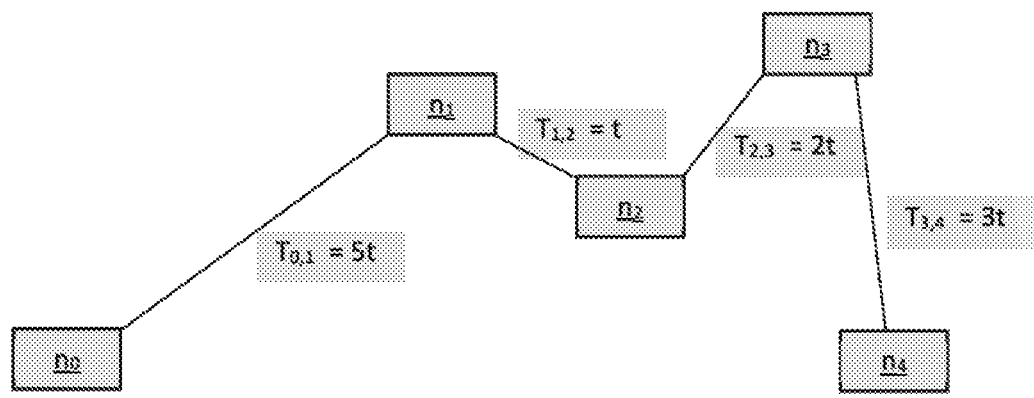

FIG. 7B schematically illustrates a MoCA network according to another simplified embodiment, in line with any of the embodiments described with reference to FIGS. 1-6. The MoCA network comprises a first node device $n_0$, such as a MoCA management device, and a number of further node devices $n_1$-$n_4$, which are interconnected over a coaxial cable 2 that forms a pure cascade network. Once all time lapses have been established, it is possible to set up a time lapse value matrix, where the rows and columns are numbered 0-4 for node devices $n_0$-$n_4$. The time lapse matrix T may further be processed to establish a branch association for each node device $n_i$ with respect to the management node device $n_0$. The time lapse matrix may be hollow and reciprocal, and processing may in one embodiment be focused on the upper triangle of the matrix. The processing may in one embodiment include comparing the time lapse value $T_{i,0}$ for a node i with respect to node 0, with the time lapse value $T_{i,j}$ for node i with respect to the other nodes.

$$T = \begin{pmatrix} 0 & 5 & 6 & 8 & 11 \\ & 0 & 1 & 3 & 6 \\ & & 0 & 2 & 5 \\ & & & 0 & 3 \\ & & & & 0 \end{pmatrix}$$

Also in this case, it may be noted that the columns and rows are arranged in order of magnitude of time lapse values with respect to node $n_0$. This order may be obtained upon collecting the time lapse values, or by post-sorting. It can be observed that for every column 2-4, the time lapse value in row 0 is larger than in the rows below, excluding the zeros. According to a processing rule of this embodiment, this indicates a cascade coaxial network. In such an embodiment, a step of storing virtual representation data of the coaxial network comprises storing a common branch association indication for each node 1-4, such as e.g. by means of a common value or branch identifier B1.

Figure 7C:
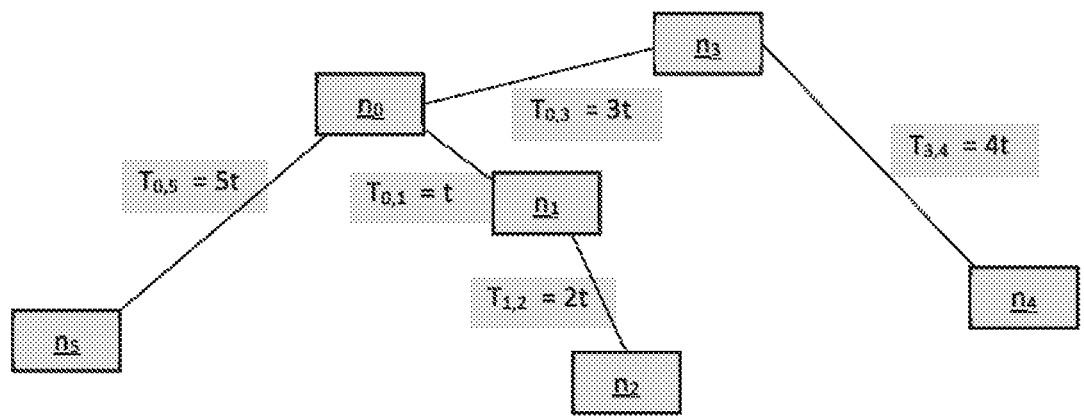

FIG. 7C schematically illustrates a MoCA network according to another simplified embodiment, in line with any of the embodiments described with reference to FIGS. 1-6. The MoCA network comprises a first node device $n_0$, such as a MoCA management device, and a number of further node devices $n_1$-$n_5$, which are interconnected over a coaxial cable 2 that forms a combined cascade and star network. Once all time lapses have been established, it is possible to set up a time lapse value matrix, where the rows and columns are numbered 0-5 for node devices $n_0$-$n_5$. The time lapse matrix T may further be processed to establish a branch association for each node device $n_i$ with respect to the management node device $n_0$. The time lapse matrix may be hollow and reciprocal, and processing may in one embodiment be focused on the upper triangle of the matrix. The processing may in one embodiment include comparing the time lapse value $T_{i,0}$ for a node i with respect to node 0, with the time lapse value $T_{i,j}$ for node i with respect to the other nodes.

$$T = \begin{pmatrix} 0 & 1 & 3 & 3 & 7 & 5 \\ & 0 & 2 & 4 & 8 & 6 \\ & & 0 & 6 & 10 & 8 \\ & & & 0 & 4 & 8 \\ & & & & 0 & 12 \\ & & & & & 0 \end{pmatrix}$$

For this embodiment, it may be noted that the columns and rows are not sorted in order of magnitude of time lapse values with respect to node $n_0$, but rather in order of true branches, which may as such be unknown. According to a processing rule, a comparison is made between the time lapse value in row 0 of a certain column with the rows below of that column, excluding the zeros. With 5 nodes in addition to node 0 there can be a maximum of 5 branches, and we may number them in accordance with the column numbers. The following output may thus be obtained following that processing rule column by column:

1. For node 5 (column 5) $T_{5,0} < T_{5,i}$, for all rows i<5. This indicates that this node 5 is alone on a branch, e.g. B5.
2. For node 4 (column 4) $T_{4,0} < T_{4,1}$, and $T_{4,2}$. This indicates that this node 4 is on a different branch B4 than nodes 1 and 2, e.g. branches B1 and B2. Furthermore, $T_{4,0} > T_{4,3}$, which indicates that node 4 is on the same branch as node 3; B3=B4.
3. For node 3 (column 3) $T_{3,0} < T_{3,1}$, and $T_{3,2}$. This indicates that this node 3 is on a different branch B3 than nodes 1 and 2, i.e. B1 and B2.
4. For node 2 (column 2) $T_{2,0} > T_{2,1}$. This indicates that this node 2 is on the same branch as node 1, i.e. B1=B2.

This provides a complete mapping of nodes to branches, with:

B5 ($n_5$);
B4 ($n_3$, $n_4$);
B2 ($n_1$, $n_2$);
B5≠B4, B2
B4≠B2
(B3=B4)
(B1=B2)

According to a processing rule of this embodiment, the finding of both common and different branches indicates a combined cascade and star coaxial network. In such an embodiment, a step of storing virtual representation data of the coaxial network comprises storing a branch association indication, e.g. B5, B4 and B2 as exemplified. This may be displayed or plotted in no other way than a correct virtualization of the network of FIG. 7C.

Figure 7D:
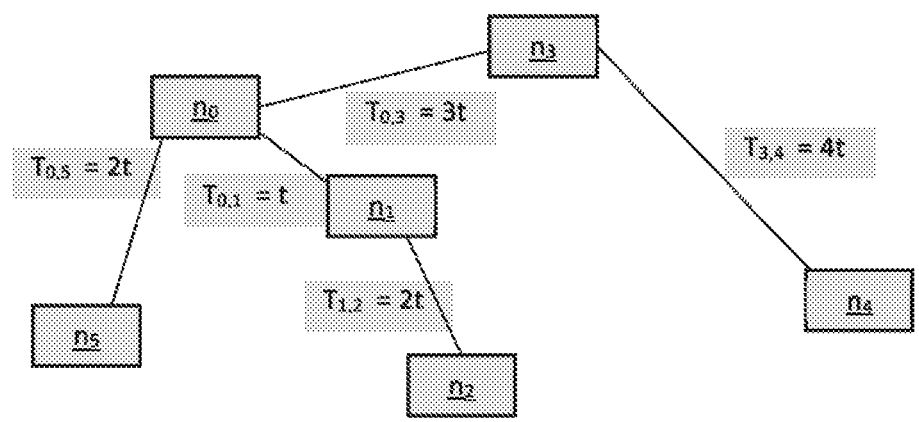

FIG. 7D schematically illustrates a MoCA network according to another simplified embodiment, similar to that of FIG. 7C. However, in this configuration the time lapse value $T_{0,5}$ is shortened from the exemplary 5 t to 2 t. Preparing the time lapse matrix in order $n_0$-$n_5$ gives the following result:

$$T = \begin{pmatrix} 0 & 1 & 3 & 3 & 7 & 2 \\ 1 & 0 & 2 & 4 & 8 & 3 \\ 3 & 2 & 0 & 6 & 10 & 5 \\ 3 & 4 & 6 & 0 & 4 & 5 \\ 7 & 8 & 10 & 4 & 0 & 9 \\ 2 & 3 & 5 & 5 & 9 & 0 \end{pmatrix}$$

Also in this case, the columns and rows are not arranged in magnitude order with respect to time lapse to $n_0$. In fact, in this exemplary embodiment, the processing rule as outlined will not generate a correct branch association. This embodiment thus serves to show that it is suitable to re-arrange the rows and columns in the node order 0-1-5-2-3-4, to obtain the following matrix (showing only the upper triangle of the reciprocal matrix):

$$T = \begin{pmatrix} 0 & 1 & 2 & 3 & 3 & 7 \\ & 0 & 3 & 2 & 4 & 8 \\ & & 0 & 5 & 5 & 9 \\ & & & 0 & 6 & 10 \\ & & & & 0 & 4 \\ & & & & & 0 \end{pmatrix}$$

According to a processing rule, a comparison is made between the time lapse value in row 0 of a certain column with the rows below of that column, excluding the zeros. The following output may thus be obtained following that processing rule column by column (again, note that the column order of nodes is 0-1-5-2-3-4):

1. For node 4 (column 5) $T_{5,0} < T_{5,i}$, for all rows i=1-3. This indicates that this node 4 is on a different branch B5 than nodes 1, 5, 2; e.g. branches B1, B2, B3. Furthermore, $T_{5,0} > T_{5,4}$. This indicates that node 4 is on the same branch as node 3; B4=B5.
2. For node 3 (column 4) $T_{4,0} < T_{4,1}$, $T_{4,2}$ and $T_{4,3}$. This indicates that this node 3 is on a different branch B3 than nodes 1, 5, 2; i.e. B1, B2, B3.
3. For node 2 (column 3) $T_{3,0} > T_{3,1}$, indicating that node 2 is on the same branch as node 1; B3=B1. Furthermore, $T_{3,0} < T_{3,2}$. This indicates that this node 3 is on a different branch than node 5.
4. For node 5 (column 2) $T_{2,0} < T_{2,1}$. This indicates that this node 5 is on a different branch B2 than node 1, B1.

This provides a complete mapping of nodes to branches, with:
B5 ($n_3$, $n_4$);
B3 ($n_1$, $n_2$);
B2 ($n_5$);
B5≠B1, B2, B3
B3≠B1, B2, B3
(B4=B5)
(B3=B1)

According to a processing rule of this embodiment, the finding of both common and different branches indicates a combined cascade and star coaxial network. In such an embodiment, a step of storing virtual representation data of the coaxial network comprises storing a branch association indication, e.g. B5, B3 and B2 as exemplified. This may be displayed or plotted in no other way than a correct virtualization of the network of FIG. 7C. It may be noted that in the present example, the original matrix showed the same values for $T_{0,2}$ and $T_{0,3}$. An alternative sorting of the matrix could thus have been 0-1-5-3-2-4, which would have generated the same correct outcome of the processing rule for determination of branches. Nevertheless, the embodiment of FIG. 7D illustrates that, dependent on in which format the matrix of time lapse values is obtained, e.g. by measuring or by retrieving from data storage or by input of data related to previous measurements, it may be suitable to sort the matrix in magnitude order.

In various embodiments, which may include the features of any of the embodiments described herein, the solution for generating a virtual representation of the coaxial network structure may include storing attenuation values associated with the cables, nodes and other elements of the coaxial network in said virtual representation data. Individual RF path attenuation [dB] between all devices in the coaxial network may be described, e.g. based on parameters extracted from MoCA software driver which may estimate attenuation. In one embodiment, it may assessed that attenuation to itself is always zero, i.e. that $a_{i,i}=0$. Other attenuation values may be deemed to be approximately reciprocal, i.e. $a_{i,j}=a_{j,i}$, though that need not always be the case. An attenuation matrix may that take the shape $$a_{i,j} = \begin{pmatrix} 0 & \cdots & a_{i,0} \\ \vdots & \ddots & \vdots \\ a_{0,j} & \cdots & 0 \end{pmatrix}$$

The attenuation values may be determined by means of measuring the attenuation between each two nodes i, j, similar to determining the time delay matrix. In this context, a method for generating a virtual representation of a coaxial network structure of a MoCA network may include measuring attenuation values $a_{i,j}$ through the coaxial network between node devices $n_i$ and $n_j$, and storing said attenuation values $a_{i,j}$ in the virtual representation data. Measuring attenuation values may e.g. be obtained by transmitting a signal of a predetermined signal strength from a first node device $n_i$ to a second node device $n_j$. A signal strength of a received signal may then be detected in the second node device $n_j$. The attenuation value $a_{i,j}$ may then be determined based on the signal strength of the transmitted signal and the received signal. This may e.g. be calculated in the management node device $n_0$, or potentially in each receiving device based on the signal level of the transmitting device being predetermined or otherwise informed by signaling to the receiving device.

Another way of calculating theoretical attenuation values is to estimate the attenuation from the time delay values based on known coaxial cable properties. For example, a typical cable attenuation value may be K=15-20 dB/100 m and the speed of the signal on the cable can be calculated from physical properties of the cable. Typically, $$V_{Cable} = \frac{C}{\sqrt{\varepsilon_r}},$$

where c is the speed of light and εr is the dielectric constant of the coaxial cable base material (typically Teflon, foamed or solid). In one embodiment, an attenuation matrix may be determined based on the time lapse matrix as $$A_{i,j} = K \frac{C}{\sqrt{\varepsilon_r}} \begin{pmatrix} 0 & \cdots & T_{i,0} \\ \vdots & \ddots & \vdots \\ T_{0,j} & \cdots & 0 \end{pmatrix}$$

The calculated cable-based attenuation values $A_{i,j}$ may also be stored in the virtual representation data.

A coaxial network where MoCA technology for external network access is installed may comprise at least lengths of coaxial cables, splitter, taps, diplexers and wall outlets. These hold the following properties:

1. Coaxial cable: Time delay and Attenuation.
2. Splitter: No time delay but Attenuation.
3. Tap: No time delay but Attenuation.
4. Diplexer: No time delay and no attenuation (neglectable)
5. Wall outlet: No time delay but attenuation.

By comparing theoretical attenuation values A, determined based on time lapse values, which primarily relates to delay caused by the coaxial network, with measured attenuation values, stored in the virtual representation data compiled in accordance with the embodiments outlined herein, a tool for finding problems or weaknesses in the network is provided. If the coaxial cable type used in the infrastructure network is known, which is generally the case, the condition of the coaxial cable network can be evaluated. Since only cable lengths introduce large signal delay (other components marginally introduce some very small delays but can be neglected in this analysis) all cable lengths can be estimated from the delay matrix. If the cable type and all lengths are known, a measured attenuation value can be compared against a theoretical value for attenuation, and if a large deviation is noted a problematic part of the coaxial network can be found.

Delay and attenuation matrices can be used to determine order of connection and determination of star or cascade type coaxial networks. Several scenarios exist of which a few have been discussed by means of examples. An end customer may typically connect a last 1-2 m coaxial cable to a MoCA modem from a CATV wall outlet. This cable can sometimes malfunction due to improper handling or aging. Analysis based on the virtualization data as provided herein may even detect a broken end user cable, by detecting high attenuation but normal time delay.

Sometimes MoCA is used at frequencies above those frequencies that CATV networks were originally designed for; i.e. >862 MHz. Coaxial cables can normally function without problems above this frequency but splitters can sometimes be a problematic component. Since delay is not dependent on attenuation, splitters with very large attenuation can be detected by comparing against a theoretical value of the splitter. Replacement of splitters can then be accomplished at those splitting points that require it. Often splitters can be hidden and not easily exchanged, therefore a tool to see if replacement is necessary is cost and time saving for the network operator. Analysis of the time lapse values, such as a time lapse matrix, may be used for obtaining information on likely positions in the coaxial network of such splitters. In one embodiment, the method for generating a virtual representation of the coaxial network structure may include comparing determined cable-based attenuation values $A_{i,j}$ with measured attenuation values $a_{i,j}$, and storing a deviation indication, based on said comparison, in said virtual representation data. Such a deviation indication may not be real data, but a source for finding the deviation upon e.g. displaying both measured and theoretical attenuation values, or plotting the virtual network structure based on the stored virtual representation data.

CATV wall outlets have attenuation depending on the signal strength entering from behind into the outlet. CATV technicians select wall outlet attenuation based on suitable signal level for TV receivers. If a wall outlet is broken or cables loose, an increased attenuation can be seen but the time delay is unchanged.

Various methods for generating a virtual representation of a coaxial network structure of a MoCA network have been disclosed by means of examples. These may be carried out by means of signal transmission between various node devices of the MoCA network, under control of an apparatus. The apparatus for generating a virtual representation of the coaxial network structure preferably comprises a control unit including a processing unit, and a memory for holding computer program code which is executable by the processing unit. The apparatus may also include a memory storage, such as a non-volatile memory, for storing the virtual representation data of the coaxial network. The control unit of the apparatus may be arranged to execute computer program code in the processing unit to carry out any of the embodiments described herein.

The apparatus may form part of a MoCA management device, which is referred to as a node $n_0$ in connection with other nodes of the MoCA network. In other embodiments, the apparatus for generating a virtual representation of the coaxial network may include a separate device, such as a computer test device, which may be connected to at least one node device of the MoCA network, preferably the management node device. The apparatus may also include a combination of the MoCA management device and an external tool, where the external tool may control the MoCA management device to carry out signaling and compilation of data. The apparatus, such as the external tool, may also include a display, for plotting or displaying a virtual representation of the coaxial network structure, based on the virtual representation data. Such displaying of the virtual coaxial network may include a highlight of points or areas not meeting expected or required quality or performance, as determined by comparing theoretical attenuation with measured attenuation, as described.

Embodiments of the methods, node devices and apparatus for generating a virtual representation of a coaxial network structure have been described by reference to the drawings, which serve as an explanation of how the invention may be put to practice, but these examples shall not be construed as limitations of the invention as defined by the claims.

The invention claimed is:

1. Method for generating a virtual representation of a coaxial network structure of a communications network, which communications network comprises a plurality of node devices, the plurality of node devices comprising a network management device and node devices $n_i$ and $n_j$, wherein the plurality of node devices are interconnected through the coaxial network, the method comprising:
    determining a time lapse matrix, the time lapse matrix comprising time lapse values $T_{i,j}$ representing propagation time through the coaxial network between node devices $n_i$ and $n_j$;
    processing the time lapse matrix to establish a branch association for each of node devices $n_i$ and $n_j$ with respect to the network management device;
    storing virtual representation data of the coaxial network comprising the branch associations.

2. The method of claim 1, wherein storing virtual representation data includes storing a branch identifier for each node device.

3. The method of claim 1, comprising:
    arranging the time lapse matrix with the network management device as a node device $n_0$, and columns and rows in magnitude order of time lapse values T with respect to $n_0$.

4. The method of claim 3, wherein processing the time lapse matrix comprises:
    comparing magnitude of time lapse values in the arranged time lapse matrix, and establishing a branch association for each of the plurality of node devices based on said comparison.

5. The method of claim 4, wherein establishing a branch association comprises determining that a pair of node devices $n_i$ and $n_j$, where i and j represents column/row order in the arranged time delay matrix, either belong to a common branch or to different branches, with respect to $n_0$, based on said comparison.

6. The method of claim 4, wherein processing the time lapse matrix comprises:
establishing a common branch association for a node device $n_i$ and a node device $n_j$, where i and j represent column/row order in the arranged time delay matrix and i>j, responsive to determining that time $T_{i,0} > T_{i,j}$.

7. The method of claim 4, wherein processing the time lapse matrix comprises:
establishing a separate branch association for a node device $n_i$ and a node device $n_j$, where i and j represents column/row order in the arranged time delay matrix and i>j, responsive to determining that time $T_{i,0} < T_{i,j}$.

8. The method of claim 1, wherein the communications network is a MoCA (Multimedia over Coaxial Alliance) Access network.

9. The method of claim 1, wherein determining a time lapse matrix comprises:
transmitting a reference signal from a first node device $n_i$ onto the coaxial network;
receiving a loopback signal from a further node device $n_j$ through the coaxial network; and
determining a time lapse value $T_{i,j}$ based on a time lapse between transmitting the reference signal and receiving the loopback signal.

10. The method of claim 9, wherein said transmitting a reference signal, receiving a loopback signal and determining a time lapse value $T_{i,j}$ are carried out successively for each pair of node devices among the plurality of node devices.

11. The method of claim 10, further comprising:
transmitting a control signal from the first node device onto the coaxial network; and
triggering a single further node device to act as loopback node.

12. The method of claim 9, further comprising:
transmitting a control signal from the first node device onto the coaxial network; and
triggering a single further node device to act as loopback node.

13. The method of claim 9, wherein the reference signal is transmitted at a first frequency, and the loopback signal is received at a second frequency.

14. The method of claim 1, further comprising:
measuring attenuation values $a_{i,j}$ through the coaxial network between node devices $n_i$ and $n_j$; and
storing the attenuation values $a_{i,j}$ in the virtual representation data.

15. The method of claim 14, wherein measuring attenuation values comprises:
transmitting a signal of a predetermined signal strength from a first node device $n_i$ to a second node device $n_j$;
detecting a signal strength of a received signal in said second node device $n_j$; and
compiling an attenuation value $a_{i,j}$ based on the signal strength of the transmitted signal and the received signal.

16. The method of claim 14, comprising:
determining cable-based attenuation values $A_{i,j}$ between node devices $n_i$ and $n_j$, based on said time value matrix; and
storing the cable-based attenuation values $A_{i,j}$ in the virtual representation data.

17. The method of claim 16, comprising:
comparing the determined cable-based attenuation values $A_{i,j}$ with the measured attenuation values $a_{i,j}$; and
storing a deviation indication, based on said comparison, in the virtual representation data.

18. The method of claim 1, further comprising:
displaying a representation of the coaxial network based on the stored virtual representation data.

19. An apparatus for generating a virtual representation of a coaxial network structure of a communications network, which communications network comprises a plurality of node devices, the plurality of node devices comprising a network management device and node devices $n_i$ and $n_j$, wherein the plurality of node devices are interconnected through the coaxial network, the apparatus comprising:
a control unit;
non-transitory computer readable memory;
computer program code, the computer program code stored on the memory and executable by the control unit; and
wherein the control unit is configured to execute the computer program code to:
determine a time lapse matrix, the time lapse matrix comprising time lapse values $T_{i,j}$ representing propagation time through the coaxial network between node devices $n_i$ and $n_j$;
process the time lapse matrix to establish a branch association for each of node devices $n_i$ and $n_j$ with respect to the network management device; and
store virtual representation data of the coaxial network comprising the branch associations in the memory.

20. The apparatus of claim 19, wherein determining a time lapse matrix comprises:
transmitting a reference signal from a first node device $n_i$ onto the coaxial network;
receiving a loopback signal from a further node device $n_j$ through the coaxial network; and
determining a time lapse value $T_{i,j}$ based on a time lapse between transmitting the reference signal and receiving the loopback signal.

* * * * *